US009746336B2

(12) United States Patent
Rutten et al.

(10) Patent No.: US 9,746,336 B2
(45) Date of Patent: Aug. 29, 2017

(54) NAVIGATION DEVICE AND METHOD

(75) Inventors: Ben Rutten, Delft (NL); Lucien Groenhuijzen, Almere (NL); Peter van Zuylen, Utrecht (NL)

(73) Assignees: TomTom Navigation B.V., Amsterdam (NL); TomTom Global Content B.V., Amsterdam (NL)

( * ) Notice: Subject to any disclaimer, the term of this patent is extended or adjusted under 35 U.S.C. 154(b) by 234 days.

(21) Appl. No.: 13/822,779

(22) PCT Filed: Sep. 13, 2010

(86) PCT No.: PCT/EP2010/063362
§ 371 (c)(1),
(2), (4) Date: Jun. 3, 2013

(87) PCT Pub. No.: WO2012/034578
PCT Pub. Date: Mar. 22, 2012

(65) Prior Publication Data
US 2013/0245944 A1 Sep. 19, 2013

(51) Int. Cl.
*G01C 21/34* (2006.01)
*G01C 21/36* (2006.01)
(Continued)

(52) U.S. Cl.
CPC ......... *G01C 21/3492* (2013.01); *G01C 21/36* (2013.01); *G01C 21/3679* (2013.01);
(Continued)

(58) Field of Classification Search
CPC .............. G01C 21/36; G01C 21/3492; G01C 21/3679; G08G 1/0962; G08G 1/09685; G08G 1/096827
See application file for complete search history.

(56) References Cited

U.S. PATENT DOCUMENTS 6,009,403 A * 12/1999 Sato .................................. 705/6
6,728,635 B2 4/2004 Hamada Hiroyuki et al.
(Continued)

FOREIGN PATENT DOCUMENTS

CN 1137455 C 2/2004
CN 101540111 A 9/2009
(Continued)

OTHER PUBLICATIONS

International Search Report issued Jun. 22, 2011 for International Application No. PCT/EP2010/063362.

*Primary Examiner* — Yuen Wong

(57) ABSTRACT

Embodiments of the present invention relate to a navigation system, comprising data storage means arranged to store at least digital map data, traffic state information, and places of interest data, and a route planning module operably coupled to the data storage means and arranged to provide access to the digital map data and calculate a route to a destination, a traffic state interrogator operably coupled to the data storage means and arranged to access said traffic state information and to determine traffic status information relevant to said calculated route to the destination, a places data interrogator operably coupled to the data storage means and arranged to access said places of interest data and to determine relevant information portions about places of interest on the calculated route dependent on the determined traffic status information, and a navigation instruction generator operably coupled to the data storage means and arranged to generate navigation instructions including the relevant information portions about places of interest on the calculated route in response to the determined traffic status.

22 Claims, 10 Drawing Sheets

(51) Int. Cl.
*G08G 1/0962* (2006.01)
*G08G 1/0968* (2006.01)

(52) U.S. Cl.
CPC ....... *G08G 1/0962* (2013.01); *G08G 1/09685* (2013.01); *G08G 1/096827* (2013.01)

(56) References Cited

U.S. PATENT DOCUMENTS

| | | |
|---|---|---|
| 7,791,500 B2 | 9/2010 | Saunders |
| 2002/0072848 A1 | 6/2002 | Hamada et al. |
| 2008/0010009 A1 | 1/2008 | Miyoshi |
| 2009/0209233 A1 | 8/2009 | Morrison |
| 2009/0319348 A1* | 12/2009 | Khosravy et al. ........... 705/14.1 |

FOREIGN PATENT DOCUMENTS

| | | |
|---|---|---|
| EP | 1708151 A2 | 10/2006 |
| JP | 2001201356 A | 7/2001 |
| JP | 2002181563 A | 6/2002 |
| JP | 2006323790 A | 11/2006 |
| JP | 2007178124 A | 7/2007 |
| WO | 2010052866 A1 | 5/2010 |

* cited by examiner

NAVIGATION DEVICE AND METHOD

CROSS-REFERENCES TO RELATED APPLICATIONS

This application is the National Stage of International Application No. PCT/EP2010/063362, filed Sep. 13, 2010 and designating the United States. The entire content of this application is incorporated herein by reference.

FIELD OF THE INVENTION

This invention relates to navigation devices and to methods for generating navigation user alerts relevant to a route in use. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max, GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location data information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest—POI), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being of interest to a user, for example of scenic beauty, or, using stored information indicative of prevailing traffic conditions on particular roads, order the calculated routes in terms of a level of likely congestion or delay on account thereof.

Other POI-based and traffic information-based route calculation and navigation criteria are also possible. For example, it has previously been proposed to provide location information regarding many other types of POI (such as airports, petrol stations, vehicle dealerships, railway stations, places of worship (e.g. Church's) automatic teller machines and such like) and to provide the user with the option to selectively display some or all of these POI on the digital map, and optionally to notify the user when they pass close to a given POI or indeed to direct the user, for example from a current location, to a selected POI.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance. Information on POIs may be of more interest to a user in such a scenario.

Devices of the type described above, for example the 720T model manufactured and supplied by TomTom International B.V., provide a reliable means for enabling users to navigate from one position to another.

Up until now, POIs have been referenced purely based on location, i.e. whether the POI is on the selected route, nearby the user, and the like.

Accordingly, it would be desirable to enable a more intelligent use of POI information in a navigation device.

SUMMARY OF THE INVENTION

In pursuit of this aim, a presently preferred embodiment of the present invention provides a navigation system, comprising data storage means arranged to store at least digital map data, traffic state information, and places of interest data, and a route planning module operably coupled to the data storage means and arranged to provide access to the digital map data and calculate a route to a destination, a traffic state interrogator operably coupled to the data storage means and arranged to access said traffic state information and to determine traffic status information relevant to said calculated route to the destination, a places data interrogator operably coupled to the data storage means and arranged to access said places of interest data and to determine relevant information portions about places of interest on the calculated route dependent on the determined traffic status information, and a navigation instruction generator operably coupled to the data storage means and arranged to generate navigation instructions including the relevant information portions about places of interest on the calculated route in response to the determined traffic status.

A further preferred embodiment of the invention provides a method of navigation, comprising the steps of accessing digital map data and calculating a route to a destination, accessing traffic status information and determining traffic status information relevant to said calculated route to the destination, accessing places of interest data and determining relevant information portions about places of interest on the calculated route dependent on the determined traffic status information, and generating navigation instructions including the relevant information portions about places of interest on the calculated route in response to the determined traffic status.

Yet another embodiment of the present invention relates to computer software comprising one or more software modules operable, when executed in an execution environment, to cause a processor to carry out the described method Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), laptop, tablet computing device, mobile telephone or portable digital assistant (PDA)) executing route planning and navigation software.

Figure 1:
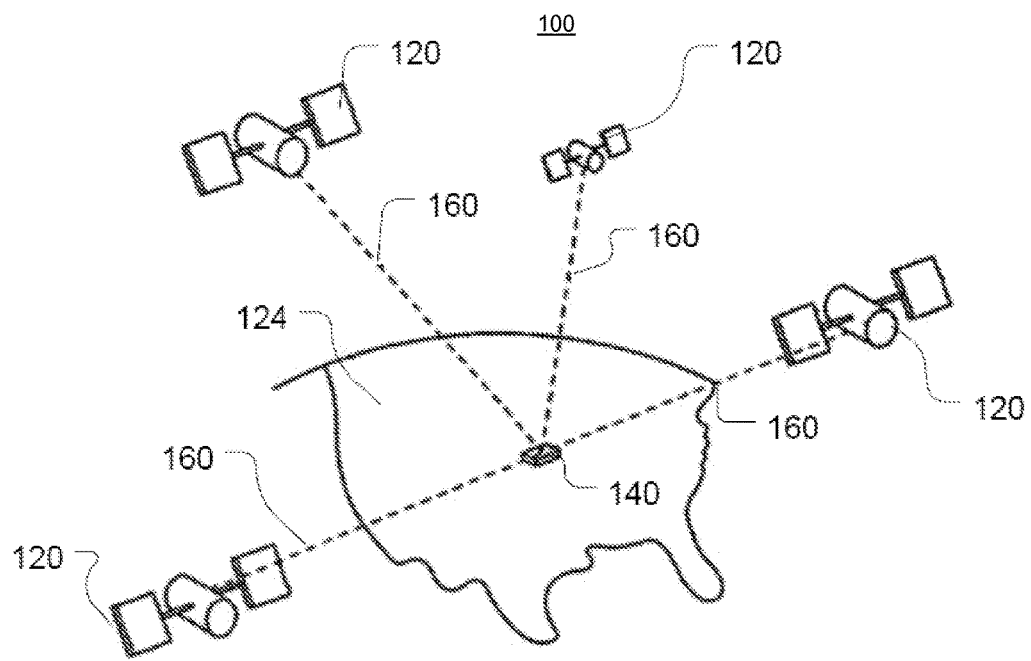
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
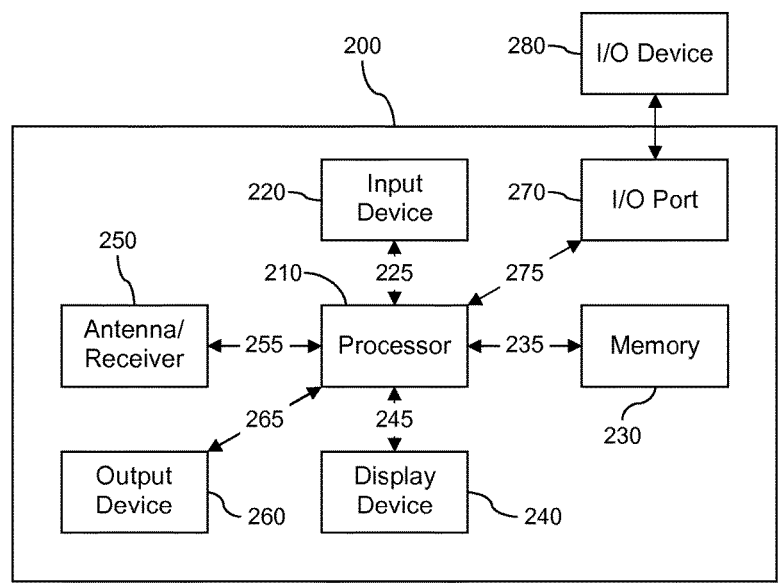
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 220 can include a microphone and software for receiving input voice commands as well.

In the navigation device 200, processor 210 is operatively coupled to and set to receive input information from input device 220 via a connection 225, and operatively coupled to at least one of display screen 240 and output device 260, via output connections 245 and 265 respectively, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The non-volatile portion of the memory resource 230 may be referred to as a local mass data storage (described below, with reference to FIG. 3). The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
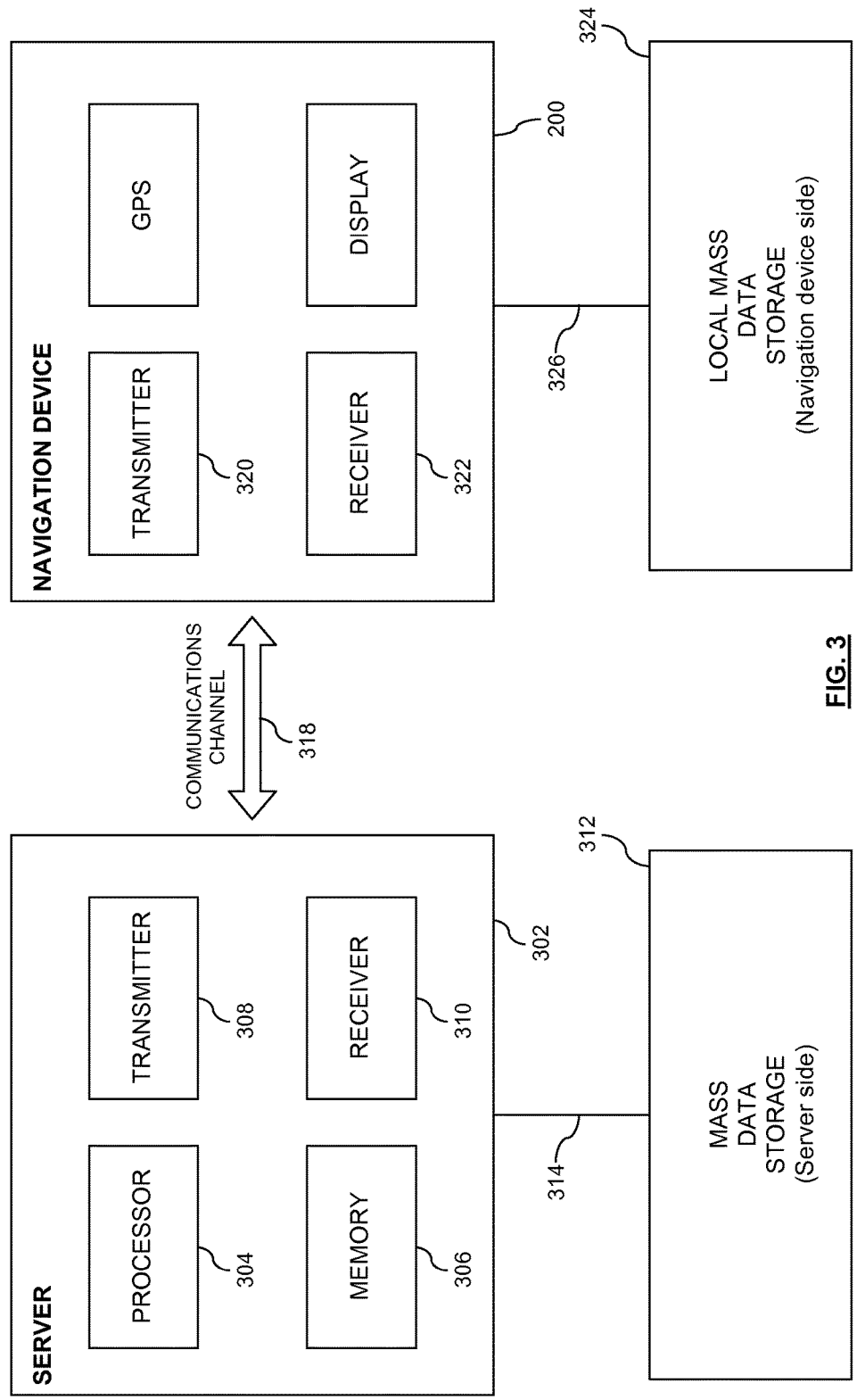
FIG. 3 is a schematic illustration of the manner in which a navigation device may receive information over a wireless communication channel.

Referring now to FIG. 3, the navigation device 200 may establish a "mobile" or telecommunications network connection with a server 302 via its own in-built communication system, or via a mobile device (not shown) such as a mobile phone, PDA, and/or any other device with mobile phone technology. The "mobile" network connection may be established via a digital connection, such as via known Bluetooth technology for example. Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, a Data Protocol Standard for the GSM standard, for example.

The navigation device 200 may include its own mobile phone technology within the navigation device 200 itself (including an antenna for example, or optionally using the internal antenna of the navigation device 200). Typically, such a PND is referred to as a connectable PND, i.e. a cPND. The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

By using a standardised connection method between a PND and a mobile device, such as Bluetooth, the navigation device may be used to correctly work with the ever changing spectrum of mobile phone models, manufacturers, etc. Model/manufacturer specific settings may be stored on the navigation device 200 for example, and the settings data stored can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively coupled to a memory 306 and further operatively coupled, via a wired or wireless connection 314, to a mass data storage device 312. The processor 304 is further operatively coupled to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302. The mass storage device 312 may also contain a lot of other information. For example, traffic data may be stored also (e.g. every minute, a full dump for all traffic data for all countries covered by the traffic data network may be placed in the storage device). Alternatively, if the cPND is only using a certain portion of the data relevant to its location, then only the relevant parts around its location and route may be stored instead. Furthermore, the mass storage device 312 may include the (or sub-portion of the) places database, as well as other commercial information such as fuel stations and prices too.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

The navigation device 200 may be connectable to a local mass storage device 324, either contained within the device itself (not shown), or connected as an external peripheral device through data connection 326. Exemplary, but non limiting examples of local mass data storage technologies are onboard flash memory, external flash memory card systems such as SD card, Compacfflash, MicroSD, etc, magnetic hard disk, or any other suitable non-volatile memory. The local mass data storage is used to store, besides the (navigable) map and the navigation application components themselves, data for use in the described navigation method such as POI information, offerings data and the like (see later Figs). Data in the local storage may optionally be updated by date on the server over communications channel 318 whenever such a connection is available, or allowed (for example, a user may disallow remote server updates when roaming abroad, due to cost).

Figure 4A:
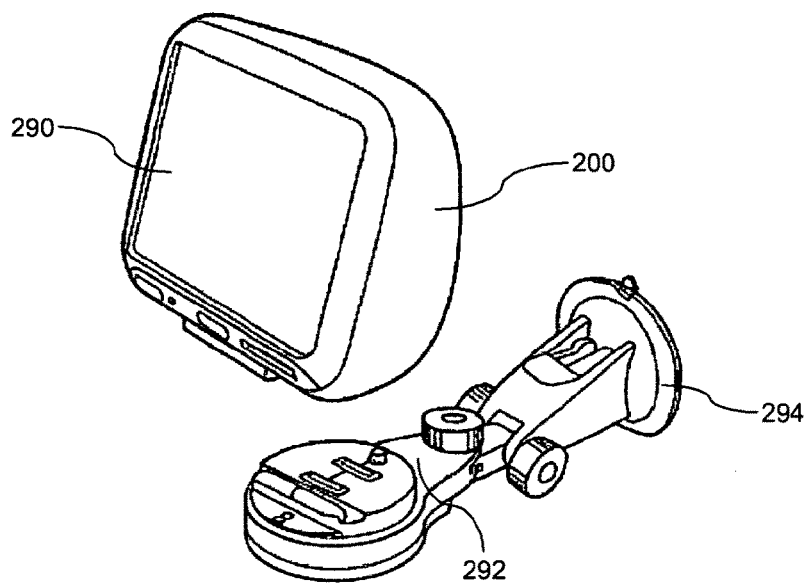
FIGS. 4A and 4B are illustrative perspective views of a navigation device.
Figure 4B:
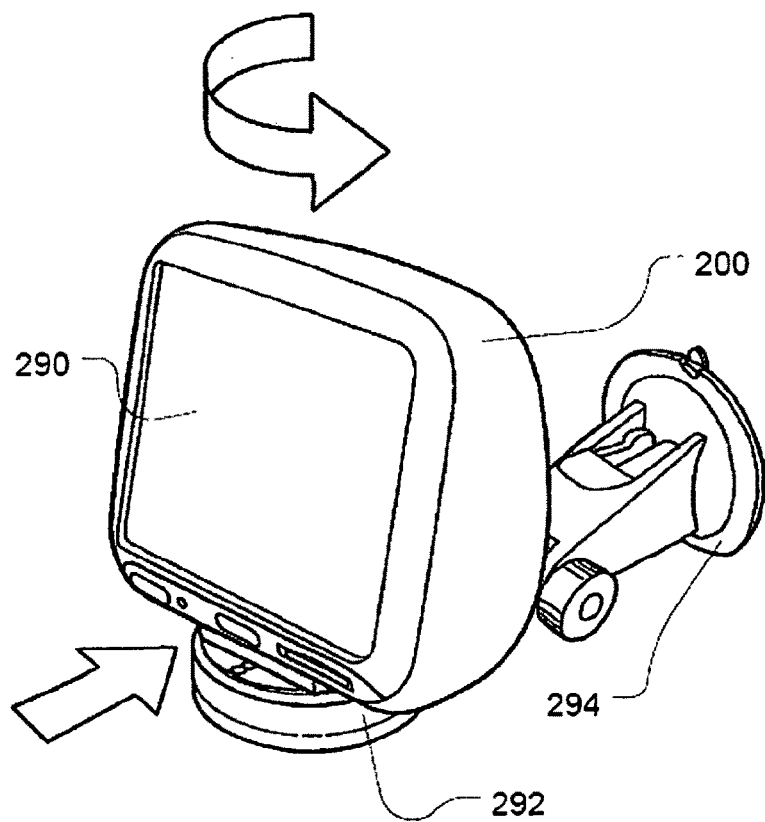

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
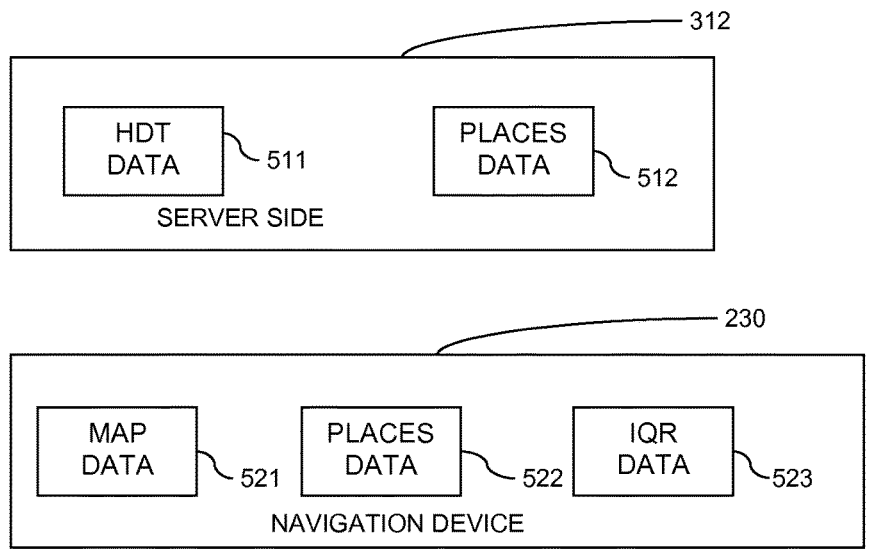
FIG. 5 is an illustrative representation of a server storage module and navigation device memory module, and the types of data contained within each.

Referring now to FIG. 5, the memory resource 230 of the navigation device is configured to store map data 521 that defines a digital map of a region, and the processor 210 is capable of referring to that stored map data to calculate routes and to generate views of, for example, the local environment in which the navigation device is currently located for display on the display screen 240. In accordance with a preferred embodiment of the present invention, the memory resource 230 also includes places/landmark data 522, that is to say, information concerning features that may more easily be noticed by a user of a navigation device than a street sign bearing the name of a road. Landmarks may comprise, for example, prominent buildings (for example, churches, railway stations or branded restaurants), geographical features (e.g. bridges, rivers, viaducts, railway crossings etc), prominent trees, monuments or more generally any prominent or conspicuous feature that can more easily be noticed by a user of a navigation device than a street sign.

A POI and Place may be considered the same, and may includes things such as companies, public services, touristic attractions etc. The Places database may be a superset of the POIs that can be featured on the pre installed POI set on the PND. The Places database may be searched from the PND device via any (wired/wireless) connection. Places/POIs may only consist of name, category and location, but can also consist of many other attributes like description, opening hours, logo, images, video etc. There may also be category specific attributes that might only be used within certain categories. Example: menu for restaurants, room amenities for hotels, etc.

The places data 522 (also known as the POI listing database) may, as shown in FIG. 5, be held separately from the digital map data 521, for example in a dedicated data store. In another envisaged implementation, the places data may comprise part of the digital map data. In either case, the places data/information stored for a given landmark may include any one or more of the geographical location (for example the latitude and longitude) of that landmark as well as an indication of the identity of that landmark (for example, the particular type of a building, e.g. whether it is a church or a railway station, a branded entity such as a restaurant (e.g. a McDonalds™ restaurant), a river, or a bridge, or the like). In a particularly preferred arrangement, landmarks may be categorised to facilitate the determination of the identity of a given landmark. Themes may also be used, where a Theme is a superset of categories. Preferably, Themes are a pre-selected collection of categories that can help the end user choose the correct POI/Place. Example: Going Out is theme that will contain categories like parking, restaurants, bowling, discotheques etc. Categories can be used in many different themes.

The memory resource 230 may also comprise routing data (IQR data) 523, providing information on suitable routes to suggest to the user during navigation. The IQR data may be separate to the other data (as shown), or combined into a single file for separation by parsing or the like.

Meanwhile, also shown in FIG. 5, the mass data storage 312 of the server side of the overall "online" navigation system may contain, amongst other data, traffic data (HDT data) 511 and the server version of the places data 512, but also may contain centralised copies of the most recent versions of any other data set in use by the system. A more detailed discussion of the contents of the server version of the Places data 512 and Places data on the navigation device 522 can be found below with reference to FIGS. 6A to 6D.

As aforementioned, it has previously been proposed to provide navigation devices with information concerning points of interest (POI) which comprise notable locations that may be of interest to a user of the device. Such POI are typically grouped into categories or Themes, and a user is typically provided with the ability to select which POI categories/Themes are to be displayed in representations of the digital map displayed on the display device 240 of the navigation device 200. Thus, Themes can be used to hide/display a group of categories in one action or create a search within these categories only. Embodiments of the present invention further provide a uniquely fused and enriched local business (and other POI) listings database in which addresses to the publicly known business/POI names, for example as published on the local business window, door, building or sign (board) are linked to and enriched by all kinds of specific data on that business or POI, collected via different sources, including but not limited to direct contact, spider and web crawling technologies and community feedback. The listings database may include anything related to the POI/Place: images, logo, menu of restaurant, opening hours, description, reviews, social media posts, etc. The local POI listing database may additionally contain a time based offer/discount data set, and/or (general or specific) advert data. These enriched POI's are location referenced in the map and can be used by the end user to navigate to directly, and then provide further useful data about the particular POI to the user. POI's may be linked to other POI's as a special relation. Example: A hotel can be linked to a preferred parking garage.

If POI data is provided, it is typical for there to be a number of predefined POI categories that each include a number of discrete POI. A user may also be provided with the ability to create POI categories or Themes, and to add POI to any created category/Theme, and optionally to a predefined POI category/theme. If a user creates their own themes, they may give them a personal name and add any existing category in the Places/POI database. The user may also be able to select POIs to be shown in themes that are subsets of a category, but filtered on attributes like subcategory or specialty.

The POI information maintained in the memory resource 230 may comprise part of the digital map data, or in another arrangement, the POI information may be held separately from the digital map data, for example in a dedicated POI data store. In either case the POI information stored for a given POI includes the geographical location (for example the latitude and longitude) of that POI as well as an indication of the POI category or theme to which that POI belongs, the aforementioned additional further specific information on each POI (offers and adverts) to enable time and/or location and/or traffic condition (in Boolean combinations) dependent display to a user for use in determining a (user considered) optimum route. Such an optimised route may now include information on not only the route to take to a destination, but also what may be done during the trip, and the like, as described in more detail below. Other information associated with POI (such as address information, a telephone number, an image or opening times) may also be stored for use. Preferably, as much known data is stored for each POI, ready for selection for use by the described navigation method, as required.

Referring now to FIGS. 6A to 6D, there are shown a number of Venn diagrams which schematically illustrate the relationship (if any) between the places (PND or server), time based discount/offer, advert, traffic (HDT) and intelligent routing (IQR) data sets.

Figure 6A:
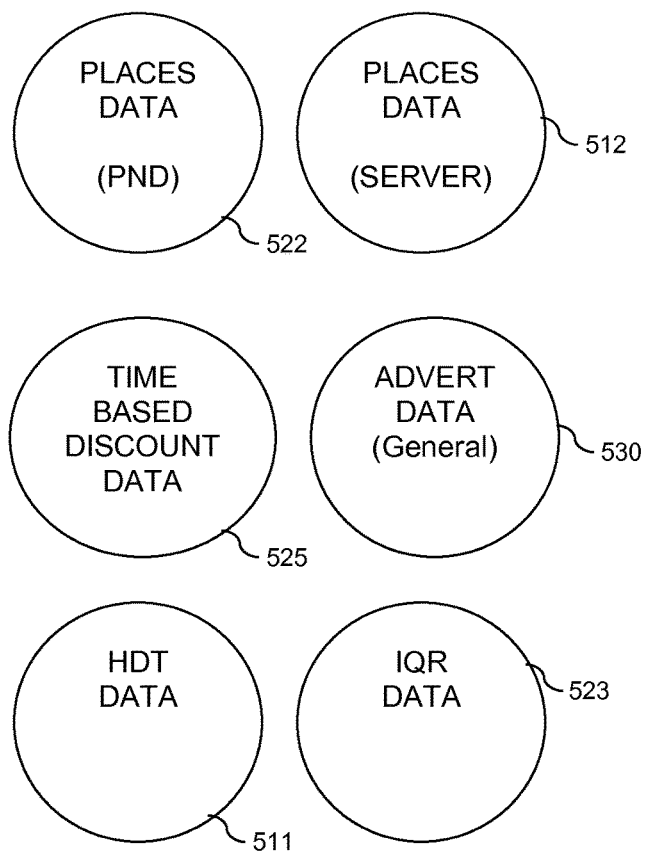
FIGS. 6A, 6B, 6C and 6D are Venn diagrams illustrating possible relationships between different data sets used in embodiments of the invention.
Figure 6B:
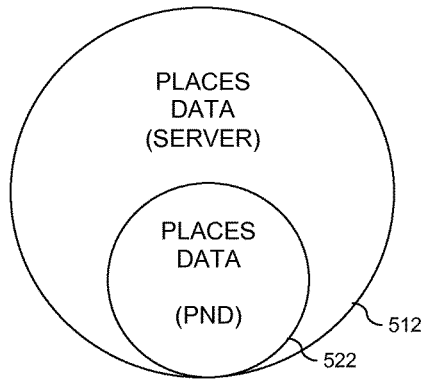
Figure 6C:
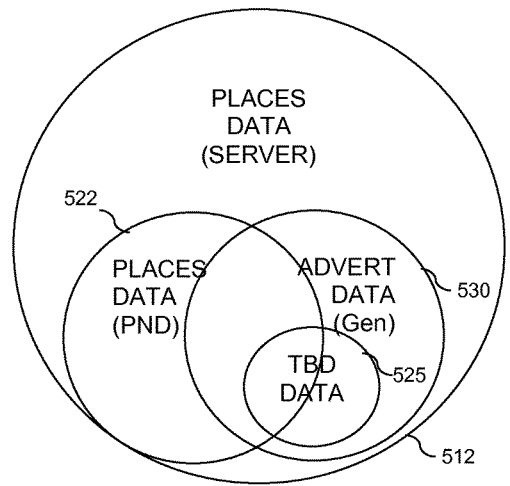

In one embodiment of the present invention shown schematically in FIG. 6A the navigation system, encompassing both PND 200 and server 302, may include a number of discrete data sets. In another embodiment shown in FIG. 6B, the places data (server side) 512 totally encompasses the places data (PND) set 522 (i.e. the PND only has a sub-set of the data on the server for the places data) and the remaining data sets (not shown) are all individual and separate from one another, as per FIG. 6A. In such an embodiment, the specific "window" of data held by the PND can be updated/replaced according to the current location of the user, age of data/time since last update, whether there has been any major (or minor) update to the data, or any other data synchronisation method. The update process may occur manually, or automatically e.g. whenever a server side version of the data set(s) includes new data not on the PND. In another embodiment shown in FIG. 6C, the places data (server side) 512 not only wholly encompasses the places data (PND) 522 as before, but also the advert 530 and discount/offer 525 data sets, with the places data (PND) 522 and advert data 530 sharing a portion, and the discount/offer data set 525 being wholly contained within the advert data 530 and sharing a portion with the places data (PND) 522. In such an embodiment, the advert and discount/offer data sets are also stored locally in the PND and refreshable from the server side as required. This is all to say that the data used by the overall navigation system may be stored in any number of arrangements on either the PND locally, or on the server 302 remotely, or both, and either grouped together, or individually.

Figure 6D:
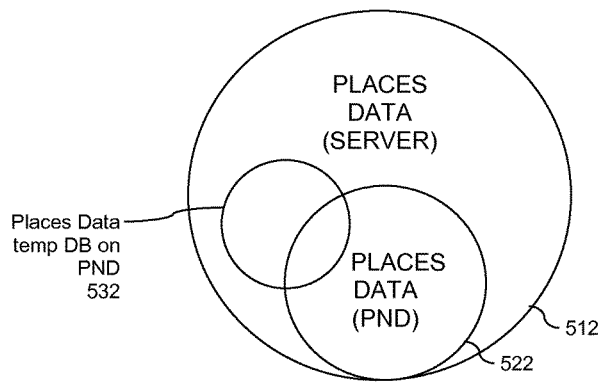

FIG. 6D shows a subset of the Places database which contains the POI/Places along the route, and which are used in the alert system. The subset is contained in a temporary database on the PND 532, and is constructed at the beginning of a trip by calculating within a certain range/distance along the calculated route towards the destination.

Data in the any of the data sets may be arranged in any of a number of suitable ways, for example places data relating to a feature that also has an associate time based discount/offer may include a data category that, if populated, indicates this fact to the processor 210 of the navigation device 200.

In some envisaged implementations, the navigation device 200 may include a pre-defined list of POI that are usually relatively easily noticed in an urban environment. In one illustrative example, the list may comprise a subset of the POI categories included in the device, and could include—for example (branded or unbranded)—petrol stations, supermarkets, branded restaurants, branded hotels, vehicle dealerships, vehicle rental facilities, cinemas, concert halls, convention centres, hospitals, pharmacies, churches, police/fire/ambulance stations, post offices, and railway stations, or the like.

In another envisaged arrangement, a user wishing to store a POI in their device may be provided with the ability to indicate whether that POI also has additional specific information useful to future users, such as offers, opening times, or user ratings, and to enter an identifier for that POI (for example by selecting a category to which that POI belongs). A user may also provide a review or other personal opinion information to be logically linked to that POI, for updating to the server over communications link, or via update during a synchronisation process carried out when the user returns home. Input of such information is not restricted to only via the PND, but may also occur via any other application, like the web or any other handheld (e.g. mobile phone, smart phone or tablet computing device).

Other functionally equivalent arrangements will be immediately apparent to persons of ordinary skill in the art.

Figure 7:
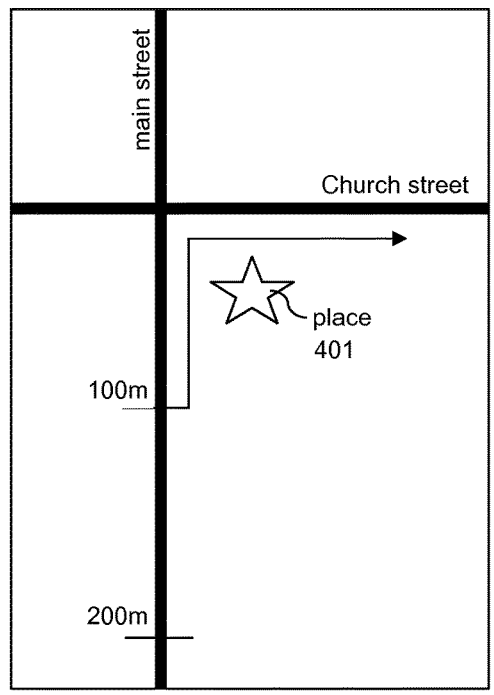
FIG. 7 is a diagrammatic representation of part of a calculated route.

Referring now to FIG. 7 of the accompanying drawings, in very general terms one aspect of the present invention embodies the appreciation that navigation instructions for provision to a user of a navigation device may be significantly enhanced by determining, for any given manoeuvre under certain conditions (particular time of location, traffic congestion around that location, and the like), whether there is POI in the vicinity of that manoeuvre which might be of interest to a user, and if that determination is positive, enhancing the navigation instruction by making reference to the POI concerned and the related specific information of interest. Example: "turn left 100 meters after the McDonald's". The principal reason for this is that the user of the device should hopefully be more easily able to identify a POI that has services or product relevant to the user at that time, or some time/traffic/route dependent offers, as will be described in more detail below.

Referring to FIG. 7, a user of a prior art navigation device following a calculated route that includes a right turn from "Main Street" into "Church Street" would typically be provided at some point (say 100 m) in advance of the manoeuvre location with the navigation instruction "turn right in 100 m" or "turn right in 100 m into Church Street", and it would be left to the user to determine when their vehicle has traveled 100 m and make the necessary turn, without further information.

In accordance with a preferred embodiment of the present invention, the processor 210 of the navigation device 200 is configured at some point before the manoeuvre to interrogate the traffic, routing, places, adverts and/or other data sets to determine whether there are any traffic conditions in the vicinity (e.g. as shown, heavy traffic in Church Street) that may mean a POI on the route would become relevant, for example become a suitable stop over point due to an offer or discount, or such like, being current and available. This is to say, while driving and navigating, a service layer on top of the core navigation software will receive a service and/or advertisement alert enabled by traffic and trip conditions, and display relevant POI data to a user dependent thereon. The traffic conditions may include any typical traffic states, such as but not limited to: general heavy traffic, slow driving, accident, stop & go on locations where normally free flow traffic occurs, and the like. The trip locations are typical places/locations at which an event or change of the trip is expected and may be located either in a static local POI database on the PND or extracted over the air via any kind of search in the server side database. Examples of typical traffic states are amongst others, congested roads, traffic lights and parking lots. Examples of typical trip locations are amongst others, a certain distance from your destination, a gas station, a restaurant stop, a ferry, a company location, a public service location, etc.

The service and/or advertisement alert function enables either a service or an advertisement function or application, which may show typical information of that location or locations in the direct neighbourhood or service or alerts of the chosen POI destination. A filtering unit (not shown) may be included, so that service alerts may be filtered and or altered by the POI destinations used in the past. This enables more relevant places of interest to be provided. Examples of relevant information on the places of interest include, amongst others, opening hours, services running at that moment (movie schedule), meal advertisement, hotel room prices, amongst many others. Besides local advertisements, also nationwide advertisements can be given for branded chains, and the like.

The advertisement effect can be further enforced (or made relevant to the user at that time and place) by including in the service alert such information as the expected delay time in the jam (e.g. when it is detected that current traffic data shows a delay of one hour around dinner time in evening rush hour and there is a restaurant nearby). In this way, the service/advertisement function provides a user with useful and/or relevant advice, such as: "Go for a meal instead of staying for one hour in the jam; we expect the jam will be away in 45 minutes". This can be even further enforced by using information only for the current chosen POI or POI's navigated to or used in the past, i.e. where a user will get a service alert/advertisement from a POI, Brand or chain that he used/searched/navigated to in the past.

Advertisement relevancy can be further increased by giving local businesses the capability to submit time, location and/or traffic condition based discount offers as a function of traffic state. So, for example, in case of heavy traffic in their locality, an enrolled service provider can receive a trigger from the navigation back-end server, and as a result enable a pre-configured discount service during the traffic jam time window. Thus, connected PNDs passing this location receive the advertisement when passing this road at slow speed. Whilst the provided example is a meal advertisement from restaurant, the offer/discount can be anything.

So, if there is a determination that there are relevant POIs with offers available, the processor 210 then constructs or retrieves an enhanced navigation instruction which refers to the POI and the current, relevant services or offers.

In the particular example of FIG. 7, the starred place 401 is a restaurant adjacent the right hand turn into Church Street, so when the processor 210 receives notification of the heavy traffic in Church street, the system searches the places, advert, time based offer data sets and locates place 401, and constructs a navigation instruction that comprises an audible (and/or textual) message which may inform the user there is heavy traffic in the next road, but that there is a restaurant on the corner beforehand, which has an meal offer running at that time. Alternatively, as shown in the diagrams, a subset (710) may be first created along the route the customer is driving and then a subset of Places may be created. The subset is contained in a temporary database on the PND, and is constructed at the beginning of a trip by calculating within a certain range/distance along the calculated route towards the destination.

In the event that the processor 210 should determine that there are multiple POIs between the current location of the vehicle and the manoeuvre, then the processor may, in a particularly preferred embodiment, be configured to select the landmark closest to the manoeuvre in question, or to provide a selection choice to the user.

Figure 8:
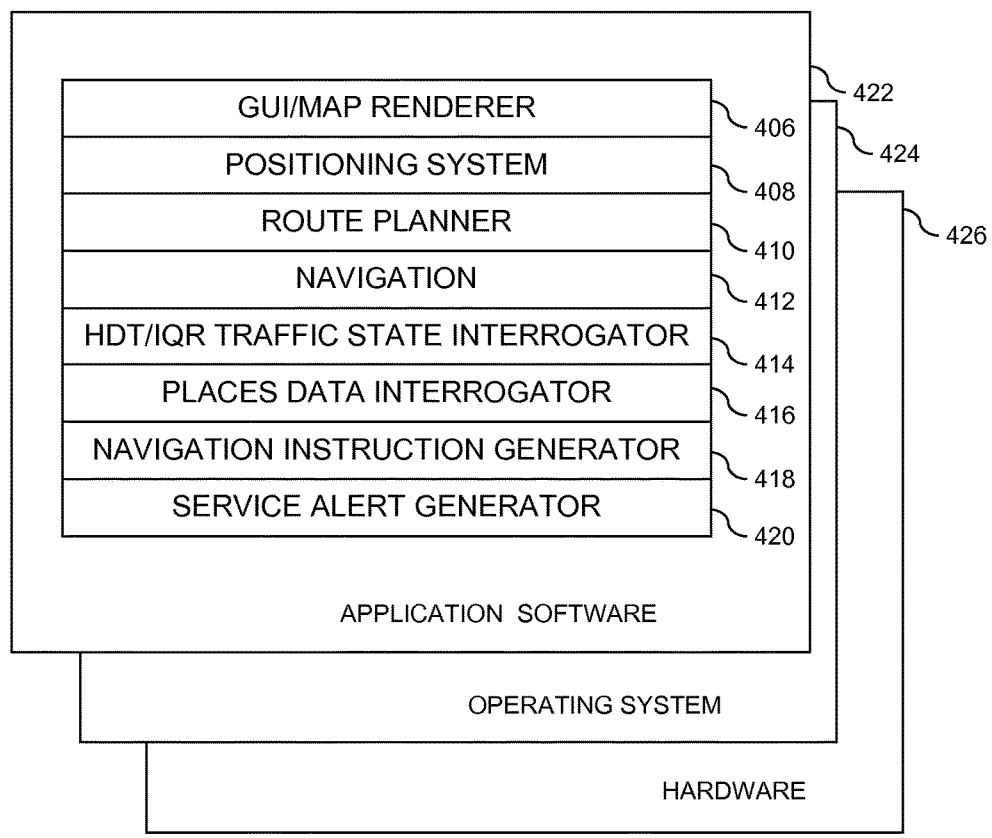
FIG. 8 is a schematic representation of the software employed by a navigation device according to an embodiment of the invention.

Referring now to FIG. 8 of the accompanying drawings, the memory resource 230 (as well as storing the digital map, landmark data, and POI data) stores a boot loader program (not shown) that is executed by the processor 210 in order to load an operating system 424 from the memory resource 230 for execution by functional hardware components 426, and which provides an environment in which application software 422 can run. The operating system 424 serves to control the functional hardware components 426 and resides between the application software 422 and the functional hardware components 426. The operating system 424 may provide universal services for the application software, for example, including maintaining current time and date information. The application software 422 provides an operational environment implementing core functions of the navigation device 200, for example map viewing, route planning, navigation functions and any other functions associated therewith.

The application software 422 may include one or more software modules as described below. Although the modules are represented separately, it will be appreciated that this is merely for the sake of explanation. Functionality may overlap between modules, and/or one module may comprise another, and/or more modules may be provided. Furthermore, the below described modules may be functionally located in the server side of the overall navigation system, so that the PND can be relatively "dumb" (i.e. not requiring excessive computational capability), with all the major calculation being offloaded onto the server instead of being carried out locally at the PND. Such an arrangement may reduce the power consumption and cost of the PND device, at the expense of potentially requiring a permanently available connection between the PND and server. Alternatively, a mixture of local and server side processing may be used, according to the availability of a connection between the PND and server, so that during periods of no connection, the PND is still able to provide navigation services, but where a connection exists, those services can be provided more quickly due to the server's increased processing capability. Such an arrangement may optimise power usage at the PND. The modules may include one or more of:

a graphical user interface (GUI) module 406 that supports other modules by providing a unified input/output interface, and provides an image renderer for map views;

a positioning system (e.g. GPS) module 408 for implementing real-time position determination to generate current position information, optionally interfacing with external positioning system hardware as hereinbefore described;

a route planning module 410, responsive to information contained in a digital map 400 and to information input by a user of the navigation device 200, for calculating a navigation route from a start location to a destination location. As aforementioned, the digital map may be stored by the memory resource 230;

a navigation module 412, responsive to (i) the current position information from the positioning system module 408, (ii) the digital map, and (iii) the calculated route from the route planning module 410, for implementing real-time navigation guidance for guiding a vehicle driver to navigate along the calculated route;

a traffic and routing interrogator 414 for interrogating the traffic (HDT) and routing (IQR) data sets for indications of traffic conditions at different locations along the planned route;

a places data interrogator module 416 responsive to (i) the current position information from the positioning system module 408, and (ii) the calculated route from the route planning module 410, to interrogate the places data for POIs proximate to manoeuvres that the user is required to make to continue along the calculated route;

a navigation instruction generation module 418 responsive to (i) the calculated from the route planning module 410, and (ii) the places data interrogator module 416 to generate a set of navigation instructions; and a service alert generator 420 to generate—in the event that a POI with relevant offers is determined to be proximate a given manoeuvre—an enhanced navigation instruction of the type hereinbefore described that refers to the POI and its associated time, traffic condition or general offers and service information.

Figure 9:
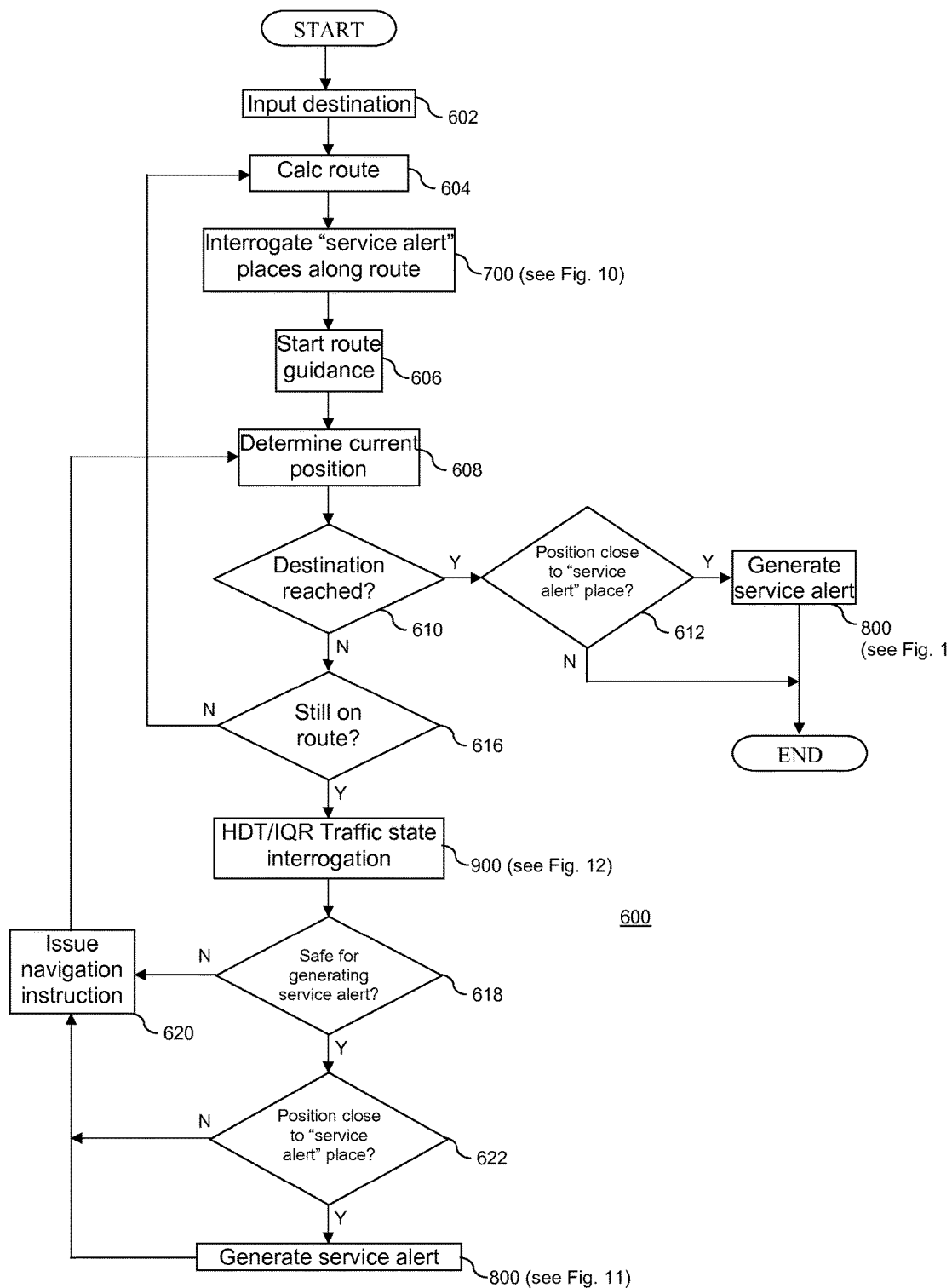
FIG. 9 is an illustrative flow diagram depicting the steps of one portion of the method by which the teachings of the present invention may be implemented.

Referring now to FIG. 9, there is depicted an illustrative flow diagram depicting the steps of one portion 600 of the method by which the teachings of the present invention may be implemented.

In a first step 602 of the method, a user interacts (in a conventional manner) with the navigation device 200 to input a destination location, and optionally a start location. In the absence of an inputted start location. The navigation device is configured to assume that any navigation route to be calculated starts at the position in which the device is currently located.

Once the user has specified the location of the destination that they wish to be guided to, the device computes, in step 604, a route from the start point to the inputted destination.

The navigation device 200 then interrogates 700 (and see FIG. 10) the places, and other, databases to locate service alert information for POIs on the (current) planned route. The navigation device 200 can then display these as appropriate, according to conditions.

The device then commences the guidance process in step 606 and provides the user with a graphical representation of their local environment together with navigation instructions to enable the use to follow the route computed in step 604.

In the course of this process, the device (in particular the processor 210) determines its current position in step 608 (for example via GPS) and subsequently determines in step 610 whether its current position matches that of the destination input in step 602, and if this determination is positive, the navigation device 200 determines at step 612 if the user is located near to a "service alert" POI (i.e. a POI with a current offer/discount, or similar running). If such a POI exists, its related service alert is shown to the user at step 800 (also see FIG. 11). If no such POI exists, or the relevant POI(s) service alerts have been shown to the user, the guidance process ceases.

If the destination has yet to be reached, the device determines in step 516 whether its current position indicates that the device is still travelling along the route computed in step 604. If the device determines that it (and by inference the vehicle in which it is travelling) has strayed from the computed route, the route to the destination is recalculated in step 604 and processing reverts to step 700.

If the device is determined in step 616 to be on route, it is then determined in step 900 (also see FIG. 12), whether the device is approaching any non-normal traffic condition along the route.

To ensure user safety, the navigation device 200 may apply safety related filtering at step 618 to try to gauge whether it is safe to provide a potentially distracting alert (beyond the usual simple navigation prompts). This can be based, for example, on speed and location relative to sensitive areas, etc. The filters may be formed as part of respective data sets, or as a separate data set.

If it is not safe to display service alerts, only the simple navigation prompt is shown at step 620. If it is determined to be safe to display service alerts, at step 622, the current position of the navigation device 200 is checked to see whether there are any locally relevant service alerts. If not, the simple navigation prompt is shown at step 620. If there are relevant local service alerts, these are generated from the respective data sets (advert, time based offer/discount, etc) at step 800 (also see FIG. 11), and shown together with the simple navigation prompt at step 620.

Figure 10:
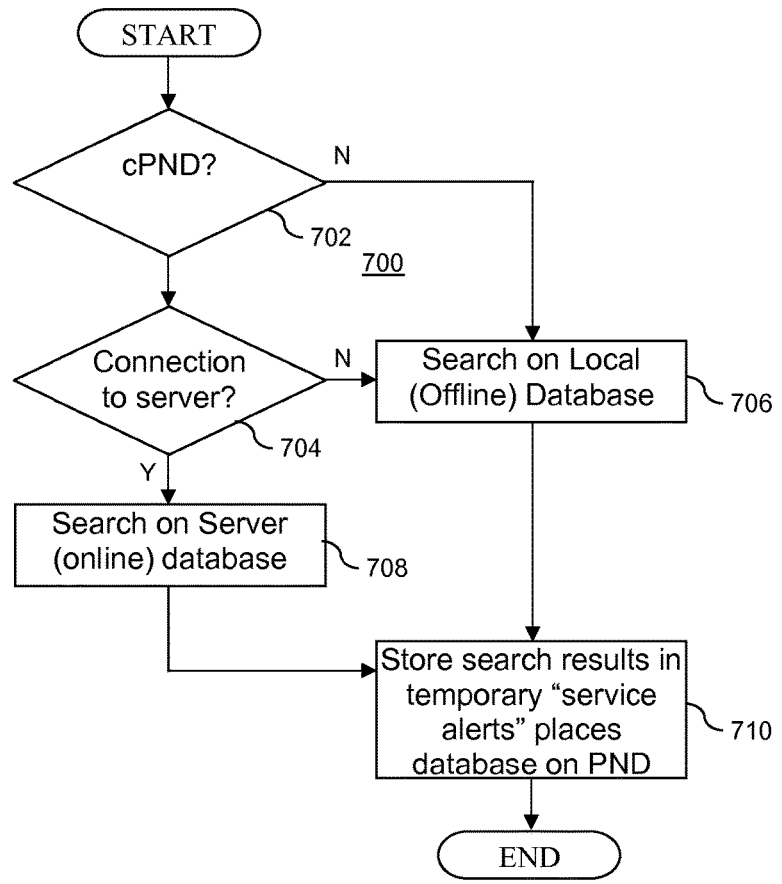
FIG. 10 is an illustrative flow diagram depicting the steps of a second portion of a method by which the teachings of the present invention may be implemented.

The aforementioned interrogation step 700 is shown in FIG. 10 and may comprise one or more of the following.

At step 702, it is checked whether the navigation device 200 is a connected PND (internally or through another device such as a mobile phone). If not, only the local databases are searched at step 706, before the results are stored in a temporary "service alert" memory at step 710.

If it is a connected PND, the connection status is checked at step 704. If the navigation device 200 is not actually connected at that time, the user may be prompted to connect manually, or pre-saved settings might allow connections to be set up automatically, as required, in which case a connection is established. If, none of the connections manage to establish themselves, again only the local databases are searched at step 706, before the results are stored in a temporary "service alert" memory at step 710.

If a connection is established, a search is carried out on the remote, service side databases at step 708, before the results are stored in a temporary "service alert" memory at step 710.

Figure 11:
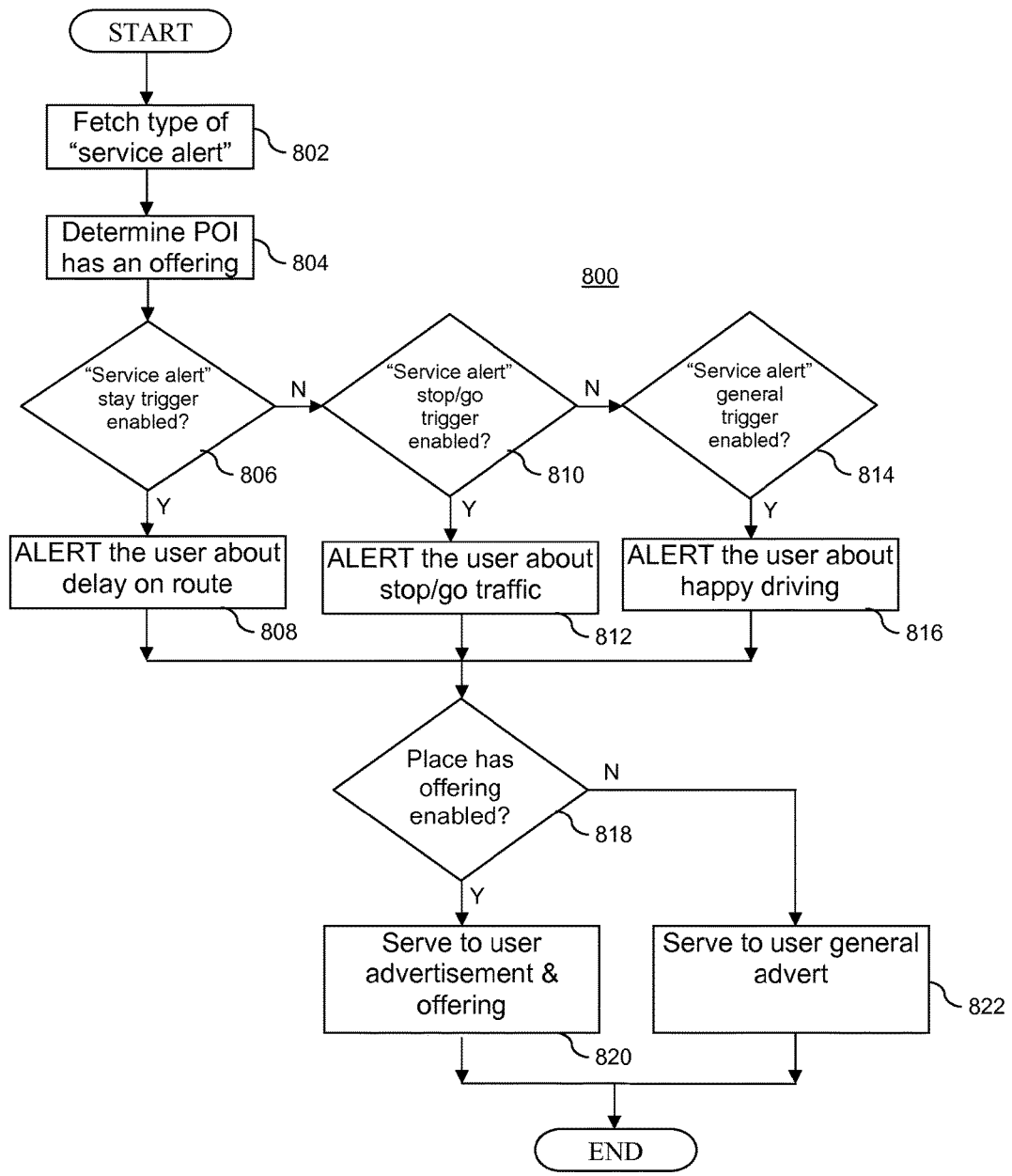
FIG. 11 is an illustrative flow diagram depicting the steps of another portion of a method by which the teachings of the present invention may be implemented.

The aforementioned service alert generation step 800 is shown in FIG. 11 and may comprise one or more of the following. It will be appreciated that the exact order of traffic, location or time condition queries is not strict, and can be formed from a more complex condition set than shown in the simplified examples.

Service alert data, as determined at 900, is fetched at step 802, and these are searched to determine those which have an offering a for a relevant (e.g. local) POI at step 804.

The service alerts for relevant POIs with offerings available are tested for trigger conditions. For the example shown, whether the condition is: a stay is advisable, as the expected delay is long at step 806; a stop/go traffic condition (i.e. traffic congestion to be avoided) at step 810; and a general, always available, set of offerings or service/product information at step 814. Dependent on the condition seen, the respective service alert is collated at steps 808, 812 and 816.

Next, the non-general service alerts are checked for whether they are currently enabled at step 818, before being shown with the general information service alert at step 820 if enabled, or only the general information service alert is shown at step 822 when they are not currently enabled. For safety or to satisfy personal choice, all alerts are optional, in that the user may opt to switch them on or off, according to their desires.

Figure 12:
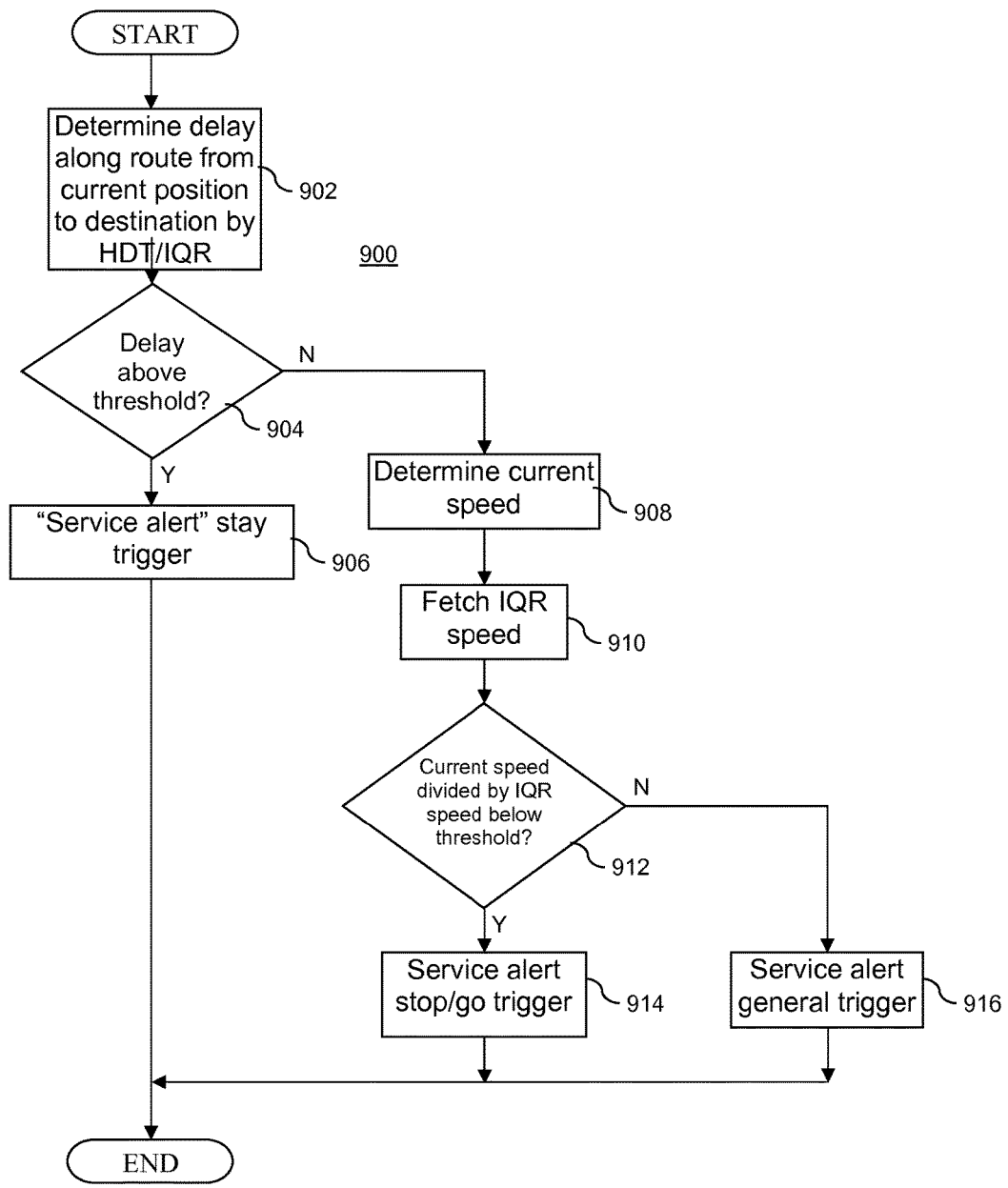
FIG. 12 is an illustrative flow diagram depicting the steps of yet another portion of a method by which the teachings of the present invention may be implemented.

The aforementioned traffic state interrogation step 900 is shown in FIG. 12 and may comprise one or more of the following. It will be appreciated that traffic and route condition tests may comprise any one or more from a wide range, including but not limited to average speed, number of stops per unit time or distance, distance to expected congestion, fuel level (if a fuel level indicator is connected to the PND), level of parking spaces available at a destination, and the like.

The aforementioned average speed calculation and traffic state alert mechanism is just an example of the alerting/trigger mechanism, and the invention is not so limited. Any suitable car/trip related trigger mechanism may be employed. Fuel level is one such other trigger mechanism, as is an indication of the number of available parking places at the destination entered.

Taking the fuel level example, the fuel level can be monitored via the interface between car and navigation device, and read out into the navigation device. Embodiments of the present invention may include a navigation device that has a calculation module which calculates the best moment of fuelling. By knowing the fuel stations along the trip/route (stored in the temp database on the PND, see Venn 6D), the exact position where you are, the remaining fuel level of the car, the fuel prices and adverts of the fuel stations along the route, it is then possible to advise the driver when it is most appropriate to refuel at one of the fuel stations along the trip.

For the car space example, when entering the destination, the vehicle driver may be advised on a parking place, if he has asked for such an indication. Depending on input factors such as a user defined acceptable walking distance from parking place to actual destination, maximum acceptable price, etc, embodiments of the present invention may provide advice of the most suitable/best parking place to use and the navigation instructions to get there. A calculation module on the navigation device would calculate this, from knowing the Places from the temp database, the prices and using the max distance the user is willing to walk.

Accordingly, the navigation system may further include a general trigger mechanism operable to trigger display of relevant information portions about places of interest on the calculated route in combination with the determined traffic status information. In the above example, the general trigger mechanism may particularly include triggers based on vehicle speed, traffic state, fuel level and parking place availability at destination.

At step 902, an expected delay from the current position on the route to the destination is determined, and then tested at step 904 to see whether it has gone through a threshold.

If a threshold has been crossed (exceeded in the example shown) then the stay suggestion service alert may be shown at step 906. If the result of the condition test is different, for example the delay is not exceeded, then another condition may be tested. For example, the presence of congestion may be detected by determining the current speed of the navigation device at step 908, fetching the route planner derived expected speed (IQR speed) at that location at step 910, and dividing the current speed by the derived IQR speed. From such a test, it can be determined whether to show a stop/go service alert at step 914, or just the general service availability level service alert at step 916.

It will be apparent from the foregoing that the teachings of the present invention provide an arrangement whereby a user (i.e. vehicle driver) is offered services at the right time, at the right place and of more relevancy or interest, where current and earlier used POIs may be used as a way to filter the messages for that user.

The traffic status information that is used to determined which offerings are displayed to a user may be updated by traffic condition detectors, operably coupled to the navigation system.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

The following claims dependencies are inclusive, meaning that where dependent claims depend from the same higher claim, the combination of one of the dependent claims with the higher claim from which they all depend, to create a new combination claim, does not preclude the combination of a further one of the dependent claims with the combination claim, unless technically inappropriate, such as for alternatives.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation system, comprising:
   data storage device arranged to store at least: digital map data; traffic state information; and places of interest data; and one or more processing circuits operably coupled to said data storage device, said processing circuits arranged to perform operations for:

accessing said digital map data and calculating a route to a destination;

providing a user with navigation instructions to enable said user to progress along said route to said destination;

accessing, while said user progresses along said route to said destination, traffic state information and determining traffic status information relevant to said route to said destination, said traffic status information indicating a non-normal traffic condition that is occurring along said route, said non-normal traffic condition being a traffic condition likely to cause a delay in travel time when compared to a free flow of traffic;

determining an amount of expected delay to said user along the route due to said non-normal traffic condition;

while said user progresses along said route to said destination, accessing said places of interest data and determining selected information portions about places of interest associated with said route, said determining comprising:

filtering said places of interest data based on trigger conditions associated with information portions about places of interest in said places of interest data, said filtering comprising eliminating information portions about places of interest for which associated trigger conditions do not correspond to said amount of expected delay and a present time of day, and retaining information portions about places of interest for which associated trigger conditions correspond to said amount of expected delay and said present time of day;

generating a service alert based on said selected information portions about places of interest associated with said route, said service alert including an offering in view of the said amount of expected delay and said present time of day; and presenting information based on said service alert, the presenting comprising presenting said amount of expected delay due to said current traffic status and said offering for said point of interest.

2. The navigation system of claim 1, wherein said offering comprises at least one of: a time dependent advertisement, a location dependent advertisement, and a traffic dependent advertisement.

3. The navigation system of claim 1, further comprising:
a server; and
a navigation device in communication with said server.

4. The navigation system of claim 3, wherein said data storage device is any one of:
remote to said navigation device in said server; and
local to said navigation device and updatable over a communications link to said server; and/or a mix of local to said navigation device and remote to said navigation device in said server.

5. The navigation system of claim 1, further comprising triggering a display of relevant information portions about places of interest on said route in combination with said determined traffic status information.

6. The navigation system of claim 1, wherein said traffic status information includes:

congestion along said route;
slow progress expected along said route; and
stop and go conditions expected along said route.

7. The navigation system of claim 1, wherein said filtering said places of interest data includes filtering according to places of interest used in the past by said user of said navigation system.

8. The navigation system of claim 1, further comprising:
soliciting feedback about a place of interest from said user, and updating said places of interest data with said feedback from said user.

9. The navigation system of claim 1, wherein said service alert comprises at least one navigation instruction that includes an indication of a selected point of interest as a reference point for making a corresponding maneuver.

10. The navigation system of claim 1, further comprising:
determining one or more factors relating to an operating environment while progressing along said route; and
filtering said service alerts to eliminate service alerts that are determined, based on said one or more factors, to be unsafe to present to said user.

11. A method of navigation, carried out by a navigation system comprising one or more processing circuits and having access to digital map data and places of interest data, said method comprising:

accessing said digital map data and calculating a route to a destination;

providing a user with navigation instructions to enable said user to progress along said route to said destination;

accessing, while said user progresses along said route to said destination, traffic state information and determining traffic status information relevant to said route to said destination, said traffic status information indicating a non-normal traffic condition that is occurring along said route, said non-normal traffic condition being a traffic condition likely to cause a delay in travel time when compared to a free flow of traffic;

determining an amount of expected delay to said user along said route due to said non-normal traffic condition;

while said user progresses along said route to said destination, accessing said places of interest data and determining selected information portions about places of interest associated with said route, said determining comprising:

filtering said places of interest data based on trigger conditions associated with information portions about places of interest in said places of interest data, said filtering comprising eliminating information portions about places of interest for which associated trigger conditions do not correspond to said amount of expected delay and a present time of day, and retaining information portions about places of interest for which associated trigger conditions correspond to said amount of expected delay and said present time of day;

generating a service alert based on said selected information portions about places of interest associated with said route, said service alert including an offering in view of the said amount of expected delay and said present time of day; and presenting information based on said service alert, the presenting comprising presenting said amount of expected delay due to said current traffic status and said offering for said point of interest.

12. The method of claim 11, further comprising:
filtering said places of interest data according to places of interest used in the past by said user of said navigation system.

13. The method of claim 11, further comprising:
soliciting feedback about a place of interest from said user, and updating said places of interest data with said feedback from said user.

14. The method of claim 11, wherein said offering comprises at least one of: a time dependent advertisement, a location dependent advertisement, and a traffic dependent advertisement.

15. The method of claim 11, further comprising triggering a display of relevant information portions about places of interest on said route in combination with said determined traffic status information.

16. The method of claim 11, wherein said traffic status information includes:
congestion along said route;
slow progress expected along said route; and
stop and go conditions expected along said route.

17. A non-transitory computer readable medium having computer software stored thereon comprising one or more software modules operable, when executed in an execution environment, to cause a processor to:
access digital map data and calculate a route to a destination;
provide a user with navigation instructions to enable said user to progress along said route to said destination;
access, while said user progresses along said route to said destination, traffic state information and determine traffic status information relevant to said route to said destination, said traffic status information indicating a non-normal traffic condition that is occurring along said route, said non-normal traffic condition being a traffic condition likely to cause a delay in travel time when compared to a free flow of traffic;
determine an amount of expected delay to said user along the route due to said non-normal traffic condition;
while said user progresses along said route to said destination, access said places of interest data and determine selected information portions about places of interest associated with said route, said determining comprising:
filtering said places of interest data based on trigger conditions associated with information portions about places of interest in said places of interest data, said filtering comprising eliminating information portions about places of interest for which associated trigger conditions do not correspond to said amount of expected delay and a present time of day, and retaining information portions about places of interest for which associated trigger conditions correspond to said amount of expected delay and said present time of day;
generate a service alert based on said selected information portions about places of interest associated with said route, said service alert including an offering in view of the said amount of expected delay and said present time of day; and
present information based on said service alert, the presenting comprising presenting said amount of expected delay due to said current traffic status and said offering for said point of interest.

18. The non-transitory computer readable medium of claim 17, wherein said offering comprises at least one of:
a time dependent advertisement, a location dependent advertisement, and a traffic dependent advertisement.

19. The non-transitory computer readable medium of claim 17, further comprising triggering a display of relevant information portions about places of interest on said calculated route in combination with said determined traffic status information.

20. The non-transitory computer readable medium of claim 17, wherein said traffic status information includes:
congestion along said route;
slow progress expected along said route; and
stop and go conditions expected along said route.

21. The non-transitory computer readable medium of claim 17, further comprising:
soliciting feedback about a place of interest from said user, and updating said places of interest data with said feedback from said user.

22. The non-transitory computer readable medium of claim 17, further comprising:
filtering said places of interest data according to places of interest used in the past by said user of said navigation system.

* * * * *